(12) United States Patent
McCauley

(10) Patent No.: US 8,109,034 B1
(45) Date of Patent: Feb. 7, 2012

(54) SHORELINE OUTRIGGER ROD SYSTEM

(76) Inventor: Jake Frank McCauley, Melbourne, FL (US)

( * ) Notice: Subject to any disclaimer, the term of this patent is extended or adjusted under 35 U.S.C. 154(b) by 11 days.

(21) Appl. No.: 12/800,148

(22) Filed: Jun. 7, 2010

(51) Int. Cl.
*A01K 87/00* (2006.01)
*A01K 91/06* (2006.01)

(52) U.S. Cl. .................. 43/27.2; 43/27.4; 43/18.1 R

(58) Field of Classification Search .............. 43/27.2, 43/27.4, 18.1 R, 20
See application file for complete search history.

(56) References Cited

U.S. PATENT DOCUMENTS

| | | | | |
|---|---|---|---|---|
| 476,940 A * | 6/1892 | Wiss | ................ | 43/17 |
| 488,874 A * | 12/1892 | Deniston | ................ | 43/27.4 |
| 523,561 A * | 7/1894 | White | ................ | 43/27.4 |
| 578,248 A * | 3/1897 | Layne | ................ | 43/27.4 |
| 809,343 A * | 1/1906 | Waldberg | ................ | 43/17 |
| 1,163,193 A * | 12/1915 | Althoff | ................ | 43/27.2 |
| 1,975,385 A * | 10/1934 | Bachus | ................ | 43/15 |
| 1,992,619 A * | 2/1935 | Johnson | ................ | 43/27.2 |
| 2,037,232 A * | 4/1936 | Hendriks | ................ | 43/27.2 |
| 2,173,511 A * | 9/1939 | Bertelli et al. | ................ | 43/43.13 |
| 2,206,569 A * | 7/1940 | John | ................ | 43/27.2 |
| 2,550,282 A * | 4/1951 | McAvoy | ................ | 43/27.2 |
| 2,564,260 A * | 8/1951 | Houser | ................ | 43/27.4 |
| 2,639,535 A * | 5/1953 | Greske | ................ | 43/27.2 |
| 2,644,263 A * | 7/1953 | Allen | ................ | 43/27.4 |
| 2,655,758 A * | 10/1953 | Warren | ................ | 43/27.4 |
| 2,749,648 A * | 6/1956 | Schneider | ................ | 43/43.12 |
| 2,753,647 A * | 7/1956 | Erickson | ................ | 43/27.2 |
| 2,762,155 A * | 9/1956 | Cothern | ................ | 43/27.4 |
| 2,912,782 A * | 11/1959 | Maximov | ................ | 43/27.2 |
| 2,951,307 A * | 9/1960 | Joy et al. | ................ | 43/27.4 |
| 2,993,292 A * | 7/1961 | Schafer | ................ | 211/119.17 |
| 3,023,532 A * | 3/1962 | Gorenty | ................ | 43/43.12 |
| 3,358,399 A * | 12/1967 | Waldmann | ................ | 43/43.12 |
| 3,462,870 A * | 8/1969 | Terilli | ................ | 43/27.4 |
| 3,654,723 A * | 4/1972 | Mercer | ................ | 43/27.4 |
| 3,664,054 A * | 5/1972 | Pickering | ................ | 43/27.4 |
| 3,672,091 A * | 6/1972 | Cloutier | ................ | 43/27.4 |
| 3,708,906 A * | 1/1973 | Stein | ................ | 43/27.4 |
| RE28,380 E * | 4/1975 | Tison | ................ | 43/27.4 |
| 3,899,846 A * | 8/1975 | Sanchez | ................ | 43/43.12 |
| 4,050,180 A * | 9/1977 | King | ................ | 43/27.4 |
| 4,184,280 A * | 1/1980 | Friend | ................ | 43/27.2 |
| 4,237,642 A * | 12/1980 | Petorella | ................ | 43/27.4 |
| 4,321,766 A * | 3/1982 | Henderson | ................ | 43/27.4 |
| 4,339,888 A * | 7/1982 | Sheng-Jung | ................ | 43/26.1 |
| 4,353,307 A * | 10/1982 | Munson | ................ | 43/27.4 |
| 4,388,774 A * | 6/1983 | Thoemke | ................ | 43/27.4 |
| 4,520,589 A * | 6/1985 | Lummis | ................ | 43/27.4 |
| 4,648,194 A * | 3/1987 | Carroll, Jr. | ................ | 43/4.5 |
| 4,807,386 A * | 2/1989 | Emory, Jr. | ................ | 43/27.4 |
| 4,856,222 A * | 8/1989 | Hannam | ................ | 43/43.1 |
| 4,928,420 A * | 5/1990 | Jackson | ................ | 43/27.4 |
| 5,115,593 A * | 5/1992 | Keough | ................ | 43/27.4 |
| 5,180,123 A * | 1/1993 | Lin | ................ | 244/155 A |
| 5,615,513 A * | 4/1997 | Luna | ................ | 43/43.13 |
| 5,732,500 A * | 3/1998 | Fitzpatrick | ................ | 43/4 |

(Continued)

*Primary Examiner* — Darren W Ark
(74) *Attorney, Agent, or Firm* — Brian S. Steinberger; Law Offices of Brian S. Steinberger, P.A.

(57) ABSTRACT

The two reel surf rod (FIG. A) is ideal for an anchor fishing technique that can be used on a dock, pier or jetty. The two reel surf rod (FIG. A) can be used in a normal fashion, if desired, with the removal of the retrieval reel (FIG. A3). The addition of a second reel seat (FIG. A4) to a regular surf rod improves and increases the function of a regular surf rod.

12 Claims, 2 Drawing Sheets

U.S. PATENT DOCUMENTS

Figure 1:
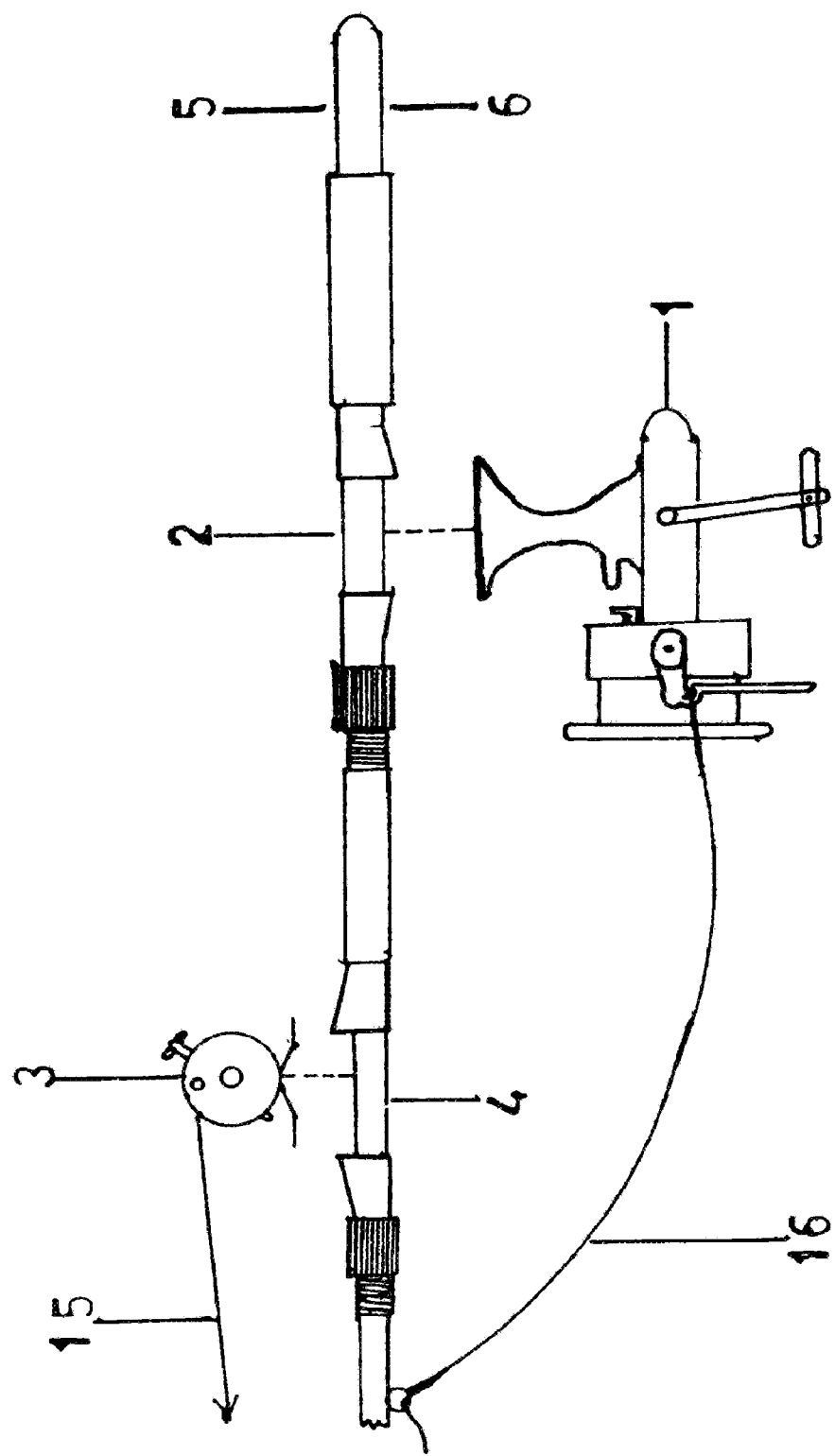

| | | | |
|---|---|---|---|
| 6,061,946 A * | 5/2000 | Toelken | 43/18.1 R |
| 6,286,245 B1 * | 9/2001 | Broberg | 43/27.4 |
| 6,834,459 B2 * | 12/2004 | van Weenen | 43/27.4 |
| 7,854,087 B1 * | 12/2010 | Pervez | 43/27.4 |
| 7,941,964 B2 * | 5/2011 | Stanton | 43/21.2 |
| 2008/0202014 A1 * | 8/2008 | Palermo | 43/26.2 |
| 2010/0005702 A1 * | 1/2010 | Palacios Cortell | 43/27.4 |

* cited by examiner

SHORELINE OUTRIGGER ROD SYSTEM

CROSS REFERENCE TO RELATED APPLICATIONS

This application claims the benefit of provisional patent application Ser. No. 60/860,915 filed 2006 Nov. 25 by the present inventor.

FEDERALLY SPONSORED RESEARCH

Not Applicable

SEQUENCE LISTING OR PROGRAM

Not Applicable

BACKGROUND

1. Field of Invention

This invention relates to the additional reel seat on a surf rod transforming a surf fishing rod to a fishing pier inshore outrigger fishing system.

2. Prior Art

Fishing supply stores commonly supply customers with surf rod fishing poles. Such fishing poles are presently sold to consumers with one reel seat for the attachment of the fishing reel. These common surf fishing rods are used with only one fishing line.

My own provisional patent application Ser. No. 12/800, 148 (2010) describes a surf rod fishing pole with a reel seat placed in the normal position for a surf rod and with a second reel seat positioned 180 degrees in reverse from the first reel seat and positioned 8 to 12 inches above the first reel seat towards the tip of the surf rod.

With this fishing technique two techniques exist accompanied with disadvantages. The first technique is such that a normal surf rod (with no second reel seat) is cast off the fishing pier with an anchor weight as far as possible. We will refer to this line and weight as anchor line and anchor weight. Rig live bait on a 3-foot wire with hooks in one end and a snap swivel in the other end referred to as fishing rig. Snap the 3-foot wire with the live bait on the anchor line and allow the rig to slide down to the water. The live bait may stay on the surface or swim down the anchor line until the live bait reaches the anchor weight on the bottom. There are faults to this technique as follows: (a) If a fish is hooked and reeled in on the normal surf rod it is a lot of work to set up and start over again using a large surf rod and an average 10 oz casting anchor. (b) If a live bait dies it must be reeled in and start the entire process again. (c) There is no control over where the live bait swims. (d) If the live bait swims down the anchor line where sharks feed you will most likely hook a shark instead of a desired fish.

The second technique is such that a normal surf rod (with no second reel seat) is cast off the fishing pier with an anchor weight as far as possible. We will refer to this line and weight as anchor line and anchor weight. Hook up a regular clothespin (as used on a clothesline to hang clothes up) to a snap swivel. The swivel will be hooked opposite the clamping jaws of the clothespin. Snap the swivel with the clothespin attached to the anchor line so it may slide down the anchor line. Before turning loose of the free running clothespin we will be using a second fishing rod (referred to as second rod) that will be used to fight the fish. Hook this second fishing rod to a live bait on a 3-foot wire with hooks in one end and a snap swivel in the other end referred to as a fishing rig. Snap the fishing rig line into the clothespin and allow it to slide down the anchor line to the water. There are faults to this second technique as follows: (a) If the bait fish dies with no method to assist in bringing the bait back up to the pier, the bait frequently pulls out of the clothespin trying to pull it along the anchor line to put another live bait out. This is due to friction created on the anchor line plus when winding on a upgrade as the anchor line on the pier is higher than where the anchor line actually goes into the water would create more stress on the clothespin that is riding on the anchor line. (b) Very limited to the size live bait fish used due to the strength of the clothespin. (c) Frequently a fish will hit the live bait fish without getting hooked. If the live bait fish is knocked out of the clothespin multiple times this would mean multiple clothespins are floating loose around where the anchor line enters the water. This will cause the fish you are trying to catch to become cautious when they see all these clothespins if you do not try to do something about the floating clothespins. One remedy is to attach a lead weight to the anchor line and cause it to slide down the anchor line carrying the extra cloth pins down to the anchor weight. Frequently when this happens at the end of the day when you try to crank your anchor line in to go home the anchor line parts due to all the extra weight of the sinkers and the clothespins. (d) You are prevented from using the more expensive outrigger trolling clips due to the possibility of losing clips with the two techniques being presently used.

With the new Shoreline Outrigger Rod System (double reel seat system) any outrigger release clip (B18) can be used as the second reel line (B15) is connected to the outrigger release clip for retrieval even if the anchor line brakes. The anchor line with the Shoreline Outrigger Rod System remains in the water the entire fishing day. It is only necessary to clamp on line (B14) from rod (B13) with a new bait fish into the outrigger release clip (B18) to retrieve or lower the live bait fish from the pier to the water surface or visa versa along anchor line (B16).

SUMMARY

A surf rod with an additional reel seat positioned 8 to 12 inches above the first reel seat towards the tip of the surf rod is ideal for the retrieval of outrigger release clip without reeling in the anchor line of surf rod.

DRAWINGS

Figures

FIG. 1 shows a side view of the surf rod butt with the additional reel seat with a second reel.

Reference Numerals for FIG. 1

Figure 2:
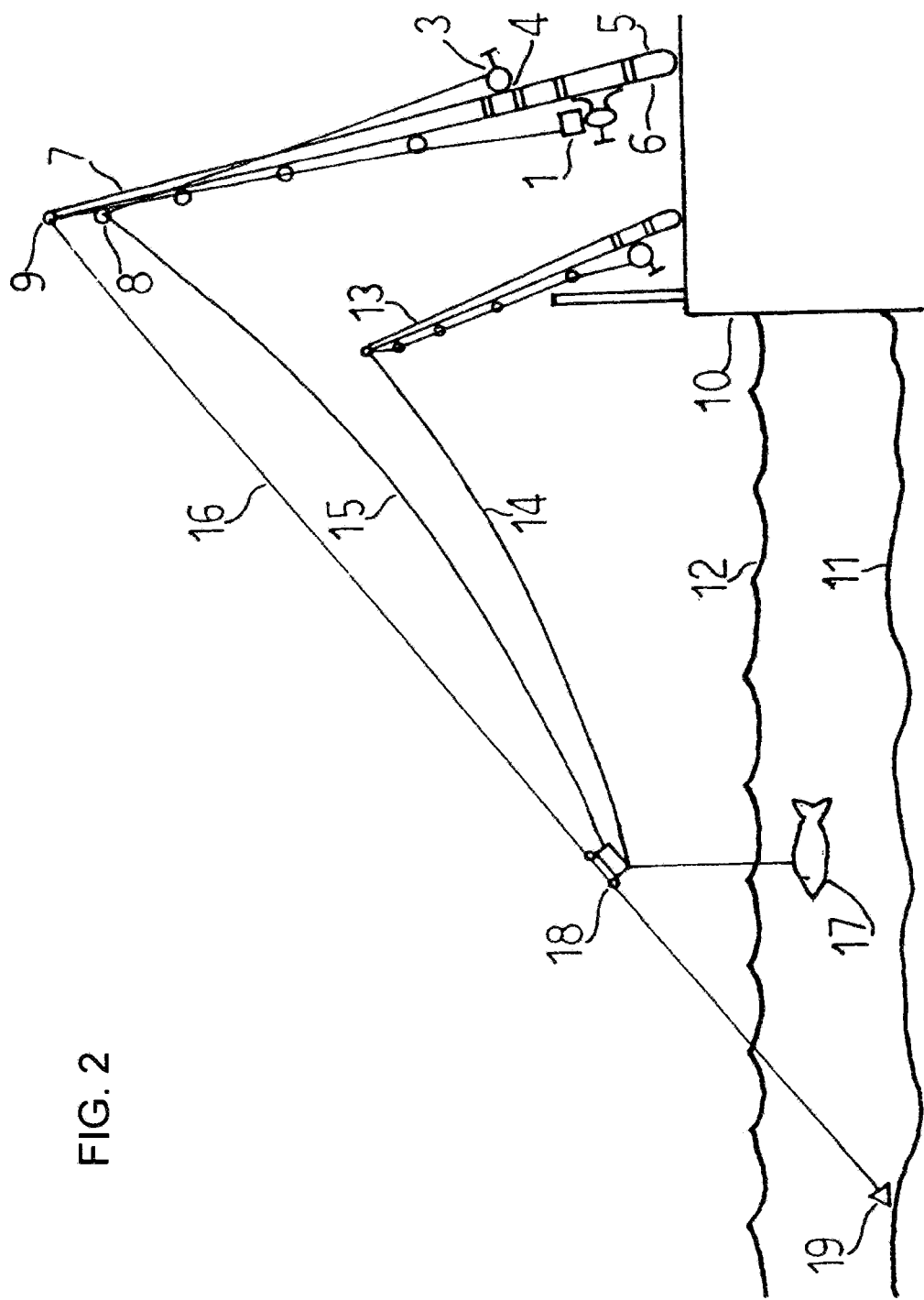

1 Anchor spinning reel
2 first reel seat
3 Retrieval bait casting reel
4 second reel seat
5 top side of surf rod
6 bottom side of surf rod
7 surf rod with two reels
15 retrieval line on second reel of surf rod
16 anchor line on first reel of surf rod FIG. 2 shows a diagram of the fishing layout using the "Shoreline Outrigger Rod System."

Reference Numerals for FIG. 2

1 Anchor spinning reel
2 first reel seat
3 Retrieval bait casting reel 4 second reel seat
5 top side of surf rod
6 bottom side of surf rod
7 surf rod with two reels
8 second guide from tip
9 tip of surf rod
10 pier
11 ocean bottom
12 water line
13 fishing rod
14 fishing line on fishing pole
15 retrieval line on second reel of surf rod
16 anchor line on first reel of surf rod
17 swimming bait fish
18 outrigger release clip or clothespin
19 anchor weigh

DETAILED DESCRIPTION

FIG. 1

The FIG. 1 depicts a partial side view of a surf rod's butt end. There are two reels on the surf rod (FIG. 7). The first reel (FIG. 1) is a large surf rod spinning reel located on the bottom of the rod (FIG. 6). The second reel (FIG. 3) is a small model bait casting reel located on an additional reel seat located on the top of the rod (FIG. 5) and 8 inches forward of the first reel (FIG. 1).

The reel seat (FIG. 2) for the first reel (FIG. 1) is positioned toward the bottom of surf rod (FIG. 6). The reel seat (FIG. 4) for the second reel (FIG. 3) is positioned on the top of surf rod (FIG. 5) and 8 inches forward of the first reel seat (FIG. 2).

The first reel (FIG. 1) depicts the anchor line (FIG. 16) through the large furrow on the surf rod. The second reel (FIG. 3) depicts the retrieval line (FIG. 15) leading to the second guide of the tip of surf rod (FIG. 8).

FIG. 2

The diagram on FIG. 2 depicts the position of rods (FIGS. 7 and 13) in use when fishing on a pier (FIG. 10). The anchor line (FIG. 16) from first reel (FIG. 1) of the surf rod (FIG. 7) is tied with an anchor weight (FIG. 19) at the end of the line (FIG. 19) and cast into the water to anchor at bottom of ocean (FIG. 11). The retrieval clip line (FIG. 15) is passed from the second reel (FIG. 3) through to the second guide (FIG. 8) from the tip of surf rod and is attached to an outrigger release clip (FIG. 18). The fishing line (FIG. 14) is attached to the outrigger release clip (FIG. 18) with a line hooked to the live bait fish (FIG. 17).

OPERATION

FIGS. 1 and 2

The manner of fishing with the Shoreline Outrigger Rod System is by casting the anchor weight (19) as far out off the fishing pier (10). Once the anchor weight is set on the ocean bottom (11), attach the outrigger release clip (18) to the anchor line (16). Do not turn loose of the outrigger release clip (18) until you fasten the retrieval line (15) to the outrigger release clip. The end of the retrieval line (15) is inserted through the second furrow (8) from the tip of the surf rod (7). The retrieval line (15) is secured to the outrigger release clip (18) with a snap swivel that is small enough to pass through the second guide (8) of the tip of the surf rod (7). The outrigger release clip (18) can now freely ride up and down anchor line (16) using reel (3) to lower and retrieve the live bait (17) to and from the water. Snap the outrigger release clip (18) to the fishing line (14) with a live bait (17) on the hook. The reel on the fishing pole (13) and the second reel (3) must be set on free spool. Lower the live bait on the outrigger release clip (18) to the water on the anchor line (16). Adjust the live bait depth in the water (12) with the second reel (3) on surf rod (7). Reset the fishing pole (13) reel and second reel (3) off free spool and wait for the game fish to knock the fishing line (14) out of the outrigger release clip (18), then reel in and fight the fish with the fishing rod (13). When a large game fish strikes the swimming bait fish (17) the fishing line (14) is pulled out of the outrigger release clip (18) and the game fish is caught using fishing rod (13). The retrieval reel (3) is reeled in bringing the outrigger release clip (18) up the anchor line (16) to the fisherman until the outrigger release clip (18) is close enough to the fisherman to clip fishing line (14) back into outrigger release clip (18), then lower outrigger release clip (18) down anchor line (16) with a new bait until the new live bait (17) is back swimming around in the water.

Advantages

From the description above, a number of advantages of the Shoreline Outrigger Rod System become evident:

(a) The surf rod may be used as a regular surf rod with the outrigger release clip rod system removed by removing the second reel off the second reel seat (4).

(b) Surf rod may be used as a anchor fishing system with a outrigger release clip and the second reel attached to the second reel seat.

(c) When pier, jetty or dock fishing this system will hold a live bait in a limited area which will limit the live bait from drifting into other fishing rigs. This would relieve a problem with lines getting tangled with other fishermen due to cross winds and currents.

(d) Larger sized live baits may be used such as mullet and bluefish up to 12 plus inches with great success.

(e) This fishing system creates a natural effect that surface feeding fish are attracted to.

(f) By reeling in or lowering the retrieval reel line (FIG. 15), one can adjust the depth and area of a swimming bait.

(g) After a game fish pulls the live bait from the outrigger release clip the outrigger release clip can be retrieved with the second reel (FIG. 3) and another bait can be placed in the outrigger release clip and returned to the water.

(h) When a live bait gets tired or dies a new active live bait can be installed on the outrigger clip just by reeling line (FIG. 15) in and quickly change baits and lower the fresh live bait fish back into the water with the retrieval reel (FIG. 3).

(i) If a undesirable fish goes after the live bait, simply reel line (FIG. 15) out of the water with retrieval reel (3) temporally until the fish goes away, which most of the time is very quickly, then lower retrieval line (15) back into the water.

CONCLUSIONS

Experienced fishermen are passionate about the sport of fishing and this system would introduce them to the excitement of catching very large fish and a new and exciting style of fishing.

The descriptions in FIGS. 1 and 2 are general because they provide an illustration of the capabilities of a two reeled surf rod and should not be limited in scope. For example, this has advantages in that it provides flexibility when choosing a retrieval reel of any size, make, or model. It also provides the user of the two reeled surf rod to remove the retrieval reel and use the surf rod in a normal fashion.

The invention has changed a fishing rod to a outrigger release system that can be used to display a live bait on the surface of the water. A fishing rod line must be clipped to an outrigger release clip to lower a fish into the water. FIG. 2 has been presented to display the concept of the invention, "Shoreline Outrigger Rod System" to achieve a better understanding of the actual technique in the Shoreline Outrigger Release System.

I claim:

1. A shoreline outrigger system, comprising:
   a surf rod having a bottom end and a tip end, with a generally straight axis and a length therebetween;
   a first reel attached to the surf rod adjacent to the bottom end of the surf rod;
   a second reel attached to the surf rod above the first reel;
   a tip guide on the surf rod adjacent to the tip end of the surf rod;
   a second guide on the surf rod below the tip end of the surf rod;
   an anchor weight;
   an anchor line running from the first reel through the tip guide and to the anchor weight which is cast out from the surf rod;
   an outrigger release clip slidably attached to slide up and down on the anchor line between the anchor weight and the tip guide;
   a clip retrieval line running from the second reel through the second guide to the outrigger release clip, the second reel controlling location of the outrigger clip on the anchor line;
   a fishing rod having a bottom end and a tip end, with a generally straight axis and a length therebetween, the length of the fishing rod being shorter than the length of the surf rod;
   a fishing reel attached adjacent to the bottom end of the fishing rod;
   a guide adjacent to the tip end of the fishing rod;
   a hook line having a hook end; and
   wherein the hook line runs from the fishing reel through the guide to the hook end, with a portion of the hook line between the hook end and the guide releaseably clipped to the outrigger release clip, wherein a fish pulling on the hook end causes the hook line to pull out of the outrigger release clip so that the fishing rod is useful to catch the fish.

2. A shoreline outrigger rod system, comprising:
   a surf rod having a bottom end and a tip end, with a generally straight axis and a length therebetween;
   a first reel seat attached to the surf rod adjacent to the bottom end of the surf rod;
   a first reel attached to the first reel seat;
   a second reel seat attached to the surf rod above the first reel seat;
   a second reel attached to the second reel seat;
   a tip guide attached to the surf rod adjacent to the tip end of the surf rod;
   a second guide attached to the surf rod below the tip end of the surf rod;
   an anchor weight;
   an anchor line running from the first reel through the tip guide and to the anchor weight which is cast out from the surf rod;
   an outrigger release clip that is slidably attached to slide up and down on the anchor line between the anchor weight and the tip guide;
   a clip retrieval line running from the second reel through the second guide to the outrigger release clip, the second reel controlling location of the outrigger clip on the anchor line;
   a fishing rod having a bottom end and a tip end, with a generally straight axis and a length therebetween, the length of the fishing rod being shorter than the length of the surf rod;
   a fishing reel attached adjacent to the bottom end of the fishing rod;
   a guide adjacent to the tip end of the fishing rod;
   a bait line having a hook end with bait; and
   wherein the bait line runs from the fishing reel through the guide to the hook end, with a portion of the bait line between the hook end and the guide releaseably clipped to the outrigger release clip, wherein a fish pulling on the hook end causes the bait line to pull out of the outrigger release clip so that the fishing rod is useful to catch the fish.

3. The shoreline outrigger rod system of claim 2, wherein the second reel seat is positioned 8-12 inches above the first reel seat.

4. The shoreline outrigger rod system of claim 2, wherein the bait includes:
   a live bait.

5. A method of fishing with a shoreline outrigger rod system, comprising the steps of:
   providing a surf rod having a bottom end and a tip end, with a generally straight axis and a length therebetween;
   attaching a first reel adjacent to the bottom end of the surf rod;
   attaching a second reel to the surf rod above the first reel;
   providing a tip guide adjacent to the tip end of the surf rod;
   providing a second guide on the surf rod below the tip end of the surf rod;
   providing an anchor weight;
   running an anchor line from the first reel through the tip guide and to the anchor weight;
   slidably attaching an outrigger release clip to slide up and down on the anchor line between the anchor weight and the tip guide;
   running a clip retrieval line from the second reel through the second guide to the outrigger release clip;
   providing a fishing rod having a bottom end and a tip end, with a generally straight axis and a length therebetween;
   attaching a fishing reel adjacent to the bottom end of the fishing rod;
   providing a guide adjacent to the tip end of the fishing rod;
   providing a bait line having a hook end with bait;
   running the bait line from the fishing reel through the guide to the hook end, with a portion of the bait line between the hook end and the guide being releaseably clipped to the outrigger release clip;
   casting the anchor weight out from the surf rod;
   controlling location of the outrigger release clip on the anchor line by the second reel; and
   pulling the bait line from the outrigger release clip when a fish is caught on the hook end of the bait line.

6. The method of claim 5, wherein the length of the fishing rod being shorter than the length of the surf rod.

7. The method of claim 5, further comprising the steps of:
   attaching the first reel to the surf rod by a first reel seat; and
   attaching the second reel to the surf rod by a second reel seat.

8. The method of claim 5, further comprising the step of:
   fishing with the outrigger system at a location selected from at least one of:
   a pier, a jetty and a dock.
9. The method of claim 5, further comprising the step of:
   using bait fish up to 12 plus inches.
10. The method of claim 5, further comprising the step of using a live bait on the hook end.
11. The method of claim 10, further comprising the step of:
    reeling in or lowering the clip retrieval line to adjust depth and area of the live bait.
12. The method of claim 5, further comprising the step of reeling in the clip retrieval line with the second reel on the surf rod to attach another bait to the hook end.

* * * * *